June 14, 1960 L. H. FINNEBURGH, JR 2,941,206

MULTI-BAND RADIO FREQUENCY ANTENNAS

Filed April 9, 1956 2 Sheets-Sheet 1

INVENTOR.
LEWIS H. FINNEBURGH, JR.
BY
Ely, Pearne & Gordon
ATTORNEYS

June 14, 1960 L. H. FINNEBURGH, JR 2,941,206

MULTI-BAND RADIO FREQUENCY ANTENNAS

Filed April 9, 1956 2 Sheets-Sheet 2

INVENTOR.
LEWIS H. FINNEBURGH, JR.
BY
Ely, Pearne & Gordon
ATTORNEYS 2,941,206

MULTI-BAND RADIO FREQUENCY ANTENNAS

Lewis H. Finneburgh, Jr., 870 Keystone Drive, Cleveland Heights 21, Ohio

Filed Apr. 9, 1956, Ser. No. 577,138

16 Claims. (Cl. 343—814)

This invention relates to radio frequency transmitting and receiving antennas designed for operation over a broad frequency range in two different frequency bands. More particularly, the invention relates to such antennas designed for operation with relatively broad band characteristics in two different frequency bands where a frequency in one band is three times a frequency in the other, as in the present low and high television bands (54–88 mc. and 174–216 mc.).

It is desired that antennas for television reception in the present low and high television bands, for example, have useful gain over the entire frequency range of each band, preferably with the greatest possible gain in the high band, where attenuation of broadcast signals with distance is generally greater than in the low band. It is also desired that such antennas have as uniform impedance as possible over both bands for satisfactorily matching the impedance of a transmission line at all frequencies of operation. It is also desired that such an antenna have high direction sensitivity with the major lobe of its radiation pattern being narrow and centered in the same direction at all frequencies of operation, and with all other lobes being relatively small. These desirable attributes of television antennas are so well and widely known as to require no elaboration.

In U.S. Patent No. 2,691,730 for Wide Band Antenna, granted October 12, 1954 to Yuen Tze Lo, a number of forms of straight and folded dipole antennas are disclosed which were specially designed to satisfy as completely as possible the foregoing requirements of antennas for reception of television broadcasts over the present low and high band channels. In all forms of those antennas, a low band half-wave dipole and two high band half-wave dipoles resonant at three times the resonant frequency of the low band dipole are connected in parallel by means of a feeding harness. The feeding harness is designed so that the low band dipole operates 180° out of phase with respect to both high band dipoles at the resonant frequency of the latter.

At low band frequencies, the high band dipoles of U.S. Patent 2,691,730 have little effect on the operation of the antennas, and the total result is essentially the same as that of a single, low band, half-wave dipole. At the resonant frequency of the high band dipoles, the low band dipole is three half-waves long and may be viewed as having a center half-wave current loop and two outer half-wave current loops which are 180° out of phase with the center loop. At the same time, each of the two high band dipoles is one half-wave long and may be viewed as having a single half-wave current loop. Since the long dipole is 180° out of phase with the short dipoles, its center half-wave loop is out of phase (opposite in sign) with respect to the half-wave current loops of both of the short dipoles. Thus, when the impedance of the feeding harness is properly selected in accordance with transmission line equations, the half-wave current loop of one of the short dipoles neutralizes the center half-wave loop of the long dipole, and the half-wave loop of the other short dipole is fed in phase with the outer half-wave loops of the long dipole, giving the effect of three half-wave, collinear elements connected for operation in phase.

Stating the high band mode of operation of the antennas of U. S. Patent No. 2,691,730 somewhat differently, the current in each short dipole at any given instant is equal in amplitude and opposite in sign to the current in the central one third portion of the long dipole, and the same in sign as the outer one third portions of the long dipole. The effect of the five current components (four being positive and one negative) is essentially the same as the sum of the three current components which are produced when three half-wave elements are connected for in phase operation as a collinear array.

The principal object of the present invention is to accomplish essentially the foregoing results with a simpler array of a smaller number of dipole elements. Stated more broadly, the principal object of the present invention is to make more efficient use of a long dipole and a short dipole for transmitting or receiving at two different frequencies, where the higher frequency is substantially three times the lower frequency, and to obtain comparable performance over broad frequency ranges above and below said higher and lower frequencies.

A further object of the invention is to reduce the complexity of the feeding harness required for connecting the plurality of dipoles to the same transmission line and to reduce the complexity and amount of the physical structure required to physically support the antenna as a whole in operative position on a mast.

For greater simplicity in the following specification and in the appended claims, the antennas of the invention will be considered as transmitting antennas, rather than as receiving antennas, it being understood that one always operates precisely in reverse of the other with the same current, voltage, and impedance relationships and in accordance with the same electrical principles.

The objectives of this invention are accomplished by employing one relatively long dipole tuned to operate as a halfwave element at the lower frequency, and only one additional dipole about one third the length of the first dipole, so that the latter is tuned to operate as a half-wave element at the higher frequency; and by connecting the low and high frequency half-wave dipoles in parallel to a pair of transmission line terminals by a suitable harness designed with reference to the physical spacing of the dipoles so that the long, low frequency dipole is connected to the transmission line to operate 180° out of phase with the short, high frequency dipole at the higher frequency, and so that the amplitude of the half-wave current loop in the short, high frequency dipole is substantially twice the amplitude of the center, half-wave, current loop in the long, low frequency dipole. This may be accomplished with a variety of physical arrangements in space and a variety of harness arrangements for connecting the dipoles to the transmission line, as hereinafter explained.

Considering one low frequency dipole and one high frequency dipole, for example, arranged and connected as described in accordance with this invention, the currents flowing from the transmission line terminals to the two dipoles will be inversely proportional to the impedances of the two-conductor feeding circuits respectively connecting the dipoles to the terminals of the common transmission line (assuming that the impedance of the array as a whole at said terminals and the power sent through the transmission line are held constant). Thus, if the impedance of the feeding circuit connecting the long, low frequency dipole to the common transmission line is twice that of the feeding circuit connecting the short, high band dipole to the transmission line, the amplitude of the current in the short, high frequency dipole will be twice that in the long, low frequency dipole. If the two dipoles are also arranged in space and electrically connected by the feeding circuits to the common transmission line so that the current in the short, high frequency dipole is 180° out of phase with the current in the central one third of the long, low frequency dipole, but in phase with the current in the two outer thirds of the long, low frequency dipole, the higher current in the former will neutralize the lower center current loop of the latter and still add to the two outer current loops of the latter. Thus, the effect of but four current components in this case (two being positive and one being negative at amplitude $I_1$, and one being positive at amplitude $I_2$, where $I_2=2I_1$) is again the same as the effect of the currents in a three-element collinear array. Since the amount of energy being radiated is the same in the two cases under comparison, it is evident that the present invention accomplishes with two dipoles what had previously been considered to require three dipoles.

At the same time, it will be appreciated that the complexity of the feeding harness required to connect but two dipoles to a common transmission line is reduced and that a lesser amount of conductor material is required for such connections, compared to an antenna comprising three dipoles connected in parallel. Similarly, the complexity of the required supporting framework and amount of structural material employed therein to support only two dipoles is reduced compared to that required to support three dipoles. These advantages are reflected in lower production costs, lower shipping costs, easier assembly and installation, and lower weight and wind resistance, which latter result also permits the use of a less costly and massive mast structure.

As will hereinafter more clearly appear, the invention also contemplates the use of a spacial arrangement of the two dipoles, with respect to the direction of the main transmitting or receiving lobe of the antenna radiation pattern, such that one of the dipoles is 90° ahead of the other in space. This makes possible a further simplification of the feeding harness and supporting framework of the antenna and contributes still further to the above described advantages of the invention.

The foregoing and still other objects, features, and advantages of the invention will be more readily understood from the following detailed description of a number of embodiments of the invention, read in conjunction with the accompanying drawings in which.

Figure 7:
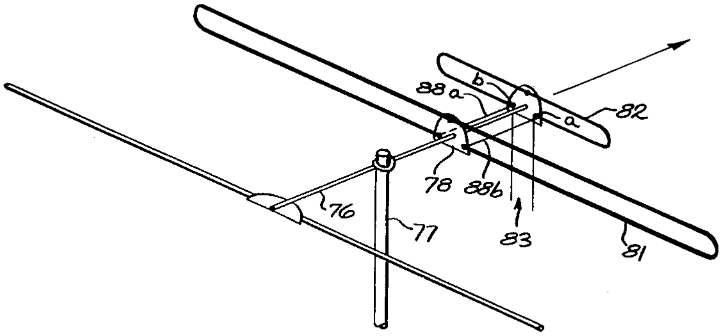
Figure 8:
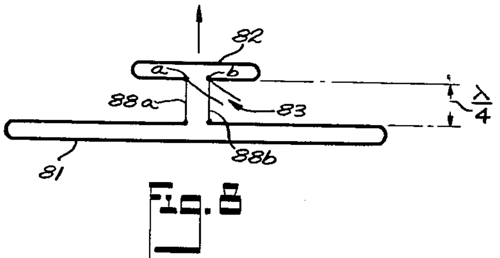

Fig. 7 is a diagrammatic perspective view of a modification of the invention in which the high band dipole is disposed in front of the low band dipole with respect to the direction of transmission of a signal, and the dipoles are shown mounted, together with a low band reflector, on a single cross-arm supported by a mast; and Fig. 8 is a diagrammatic plan view of the dipoles of Fig. 7, showing more clearly the manner in which they are connected for operation 180° out of phase.

Figure 1:
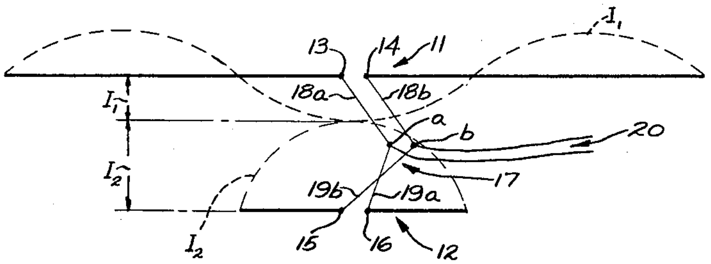
Figure 1 is a diagrammatic front elevation of an antenna embodying the invention and comprising two simple dipoles connected in parallel and 180° out of phase.

Referring first to Fig. 1 of the drawings, a long, simple dipole 11 that is cut or tuned to operate as a half-wave radiating element at a selected frequency of, say, 65 mc. in the low television band, is disposed vertically above and parallel to a short, simple dipole 12 tuned to operate as a half-wave radiating element at three times that frequency or, say 195 mc. in the high television band. Though shown and described with the long dipole 11 disposed vertically above the short dipole 12 for transmitting in either direction normal to the plane of the drawing, the dipoles may have their positions reversed without in any manner altering the operation of the antenna. Also, the horizontal disposition of the dipoles and their vertically superposed relationship have been selected for illustrating use of the antenna for horizontally polarized radiation presently employed for television. When used for radiation having a different polarization, the array illustrated would be rotated to a correspondingly different angle about an axis normal to the plane of the drawing while keeping the two dipoles transversely aligned in a plane normal to the direction of the transmission, i.e. in the plane of the drawing.

Both of the dipoles 11 and 12 are center fed at points 13, 14 and 15, 16, respectively, by means of a feeding harness 17. The harness 17 comprises a pair of spaced parallel conductors 18*a* and 18*b* of equal length which connect the feed points 13 and 14 of the long dipole to terminals *a* and *b*, respectively, of a two-conductor transmission line 20; and the harness also comprises a pair of similar conductors 19*a* and 19*b* which are parallel and of equal length (not shown to scale) and which connect the feed points 15 and 16 of the short dipole to terminals *a* and *b*, respectively. As will be noted, the connections of the feed points 13 and 14 of the long dipole 11 to the terminals *a* and *b* are reversed relative to the connections of the corresponding feed points 15 and 16 of the short dipole 12 to those terminals. Also, the pairs of conductors 18*a*, 18*b* and 19*a*, 19*b* are intended to be the same length and this length is preferably ¼ wave length at the half-wave resonant frequency of the short dipole 12. Thus, the pairs of conductors 18*a*, 18*b* and 19*a*, 19*b* constitute impedance transformers connecting the dipoles 11 and 12 in parallel and 180° out of phase with each other.

The currents flowing at the two sets of antenna terminals 23, 24 and 25, 26 connected in parallel by two impedance transformer circuits of this kind to a common voltage (at terminals *a, b*) are inversely proportional to the characteristic impedances of the impedance transformer circuits themselves and are independent of the impedances of the antennas 11 and 12 to which they are respectively connected. Thus, if the characteristic impedance of the impedance transformer comprising the conductors 18*a*, 18*b* is twice that of the impedance transformer comprising the conductors 19*a*, 19*b*, the current at the terminals of the short dipole 12 will be twice the current at the terminals of the long dipole 11. The relative amplitudes of these currents as they exist in the dipoles 11 and 12 are respectively represented in Fig. 1 by dimensional arrows $I_1$ and $I_2$, and the phase relationships of these currents (standing waves) at the resonant frequency of the short dipole 12 are shown by dotted lines, also designated $I_1$ and $I_2$.

As explained, the two impedance transformers in the harness 17 may be designed to make the amplitude of the current $I_2$ twice that of $I_1$. Since the two dipoles are connected 180° out of phase with each other, the half-wave current loop $I_2$ neutralizes or cancels the center half-wave loop of the current $I_1$ and adds an equal value in phase with the two outer half-wave loops of the current $I_1$. The result at the resonant frequency of the short dipole 12 is the equivalent, both for transmission and reception, of that obtained with three half-wave elements connected for in-phase operation as a collinear array.

At one-third the resonant frequency of the short dipole 12, the long dipole 11 is resonant as a half-wave radiating element and functions in a conventional manner. At this frequency, the two impedance transformers of the harness 17 are only 1/12 wave in length and, therefore, cause little impedance transformation.

Figure 2:
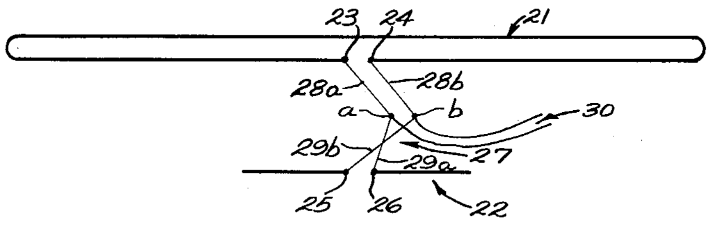
Fig. 2 is a diagrammatic elevation of a modified form of the invention in which the low band dipole is a folded dipole and the high band dipole is a simple dipole.

While Fig. 1 illustrates the invention as applied to simple or straight dipoles, it is often desirable to maintain a higher impedance for the driven or radiating elements of the antenna. This can be done, for example, by using a folded dipole 21 for the low band and a simple, straight dipole 22 for the high band, as shown in Fig. 2. The folded dipole 21 may be fed at points 23 and 24 and the straight dipole 22 at points 25 and 26 by means of a feeding harness 27 like the harness 17 in Fig. 1, having terminals *a, b* for a two-conductor transmission line 30. Again, the two dipoles are connected to the transmission line terminals *a, b* with 180° phase reversal. By making the impedance transformer 28*a*, 28*b* have a characteristic impedance twice that of the impedance transformer 29*a*, 29*b*, the same current relationships in the two dipoles exist as in the antenna of Fig. 1. Again, as regards antenna current relationships at the high band resonant frequency of the short dipole 22, the result is the equivalent of three half-wave radiating elements connected for in phase operation as a collinear array.

Figure 3:
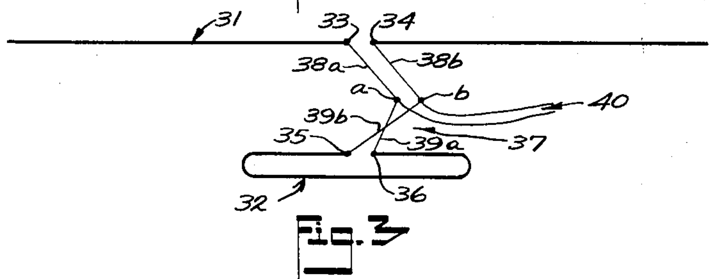
Fig. 3 is a diagrammatic elevation of another modification of the invention in which the low band dipole is a simple dipole and the high band dipole is a folded dipole.

Alternatively, a simple dipole 31 may be used as the low band dipole and a folded dipole 32 as the high band dipole, as shown in Fig. 3. The straight dipole 31 may be fed at points 33 and 34 and the folded dipole at points 35 and 36 by means of a feeding harness 37, like the harness 17 in Fig. 1, having terminals *a, b* for a two-conductor transmission line 40. Again, the two dipoles are connected to the transmission line terminals *a, b* with 180° phase reversal. By making the impedance transformer 38*a*, 38*b* have a characteristic impedance twice that of the impedance transformer 39*a*, 39*b*, the same current relationships in the two dipoles exist as in the antenna of Fig. 1. Again, as regards antenna current relationships at the high band resonant frequency of the short dipole 32, the result is the equivalent of three half-wave radiating elements connected for in phase operation as a collinear array.

As a further alternative, and a preferred form of the invention for television reception because of impedance considerations, long and short folded dipoles 41 and 42 may be used as the low band and high band dipoles respectively. The low band dipole 41 may be fed at points 43 and 44, and the high band dipole 42 may be fed at points 45 and 46 by means of a feeding harness 47, like the harness 17 in Fig. 1, having terminals *a, b*, for a two-conductor transmission line 50. Again, the two dipoles are connected to the transmission line terminals *a, b* with 180° phase reversal. By making the impedance transformer 48*a*, 48*b* have a characteristic impedance twice that of the impedance transformer 49*a*, 49*b*, the same current relationships in the two dipoles exist as in the antenna of Fig. 1. Again, as regards antenna current relationships, the result is the equivalent of three half-wave radiating elements connected for in phase operation as a collinear array.

In all embodiments of the invention illustrated in Figs. 1 to 4 and described above, the optimum characteristic impedances given to the two impedance transformers are determined by the impedances of the dipoles of the array and by the impedance of the transmission line to be connected to the terminals *a, b*. As is well understood, the impedance of the antenna as a whole at the terminals *a, b* should be brought as close as possible to the impedance of the transmission line for most efficient reception. The various forms of the invention lend themselves to optimum impedance matching, at both the high and low resonant frequencies of the dipoles, when different transmission line impedances are involved. The modification of Fig. 4 lends itself to excellent matching to a 300 ohm line at low band and high band television frequencies and, therefore, is preferred for television reception, for which the use of a 300 ohm transmission line is normally desired.

Figure 4:
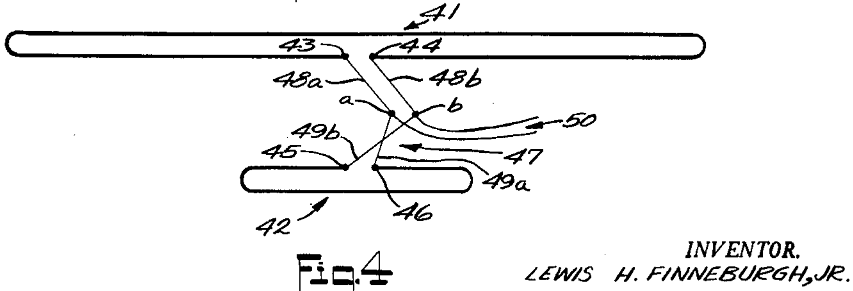
Fig. 4 is a diagrammatic elevation of still another modification of the invention in which both of the dipoles are folded dipoles.

To illustrate how the characteristic impedances of the impedance transformers may be selected for a given form of the invention, the antenna of Fig. 4 will be used as an example. Assuming:

$Z_{A1}$=impedance of the low frequency dipole 41 at the high resonant frequency of the high frequency dipole 42, $Z_{A2}$=impedance of the high frequency dipole 42 at its high resonant frequency, $Z_1$=characteristic impedance of the impedance transformer 48*a*, 48*b* feeding the dipole 41, $Z_2$=characteristic impedance of the impedance transformer 49*a*, 49*b* feeding the dipole 42, $Z_{T1}$=impedance of the low frequency dipole 41 and its impedance transformer, measured at terminals *a, b* at the high resonant frequency of dipole 42, $Z_{T2}$=impedance of the high frequency dipole 42 and its impedance transformer, measured at terminals *a, b* at its high resonant frequency, and $Z_T$=impedance of the antenna as a whole at terminals *a, b* at the high resonant frequency of dipole 42.

Assuming further that $Z_{A1}$ and $Z_{A2}$ are both 300 ohms at the high frequency at which the long dipole 41 is 3/2 waves in length and the short dipole 42 is 1/2 wave in length (convenient approximations of the actual impedances), then $$Z_{T1}=\frac{(Z_1)^2}{Z_{A1}}=\frac{(Z_1)^2}{300}$$

$$Z_{T2}=\frac{(Z_2)^2}{Z_{A2}}=\frac{(Z_2)^2}{300}$$

Since the desired 2:1 ratio of the current amplitudes in the two dipoles requires that $Z_1=2Z_2$, then $$Z_{T1}=4\times\frac{(Z_2)^2}{300}=4Z_{T2}$$

Stated in words, the impedance of the long dipole 41 and its impedance transformer, measured at the terminals *a, b*, should be 4 times the impedance of the short dipole 42 and its impedance transformer, measured at the terminals *a, b*. Then, since it is desired that $Z_T$ be 300 ohms, $$Z_T=\frac{(Z_{T1})(Z_{T2})}{Z_{T1}+Z_{T2}}=300\text{ ohms}$$

Substituting $4Z_{T2}$ for $Z_{T1}$, then $$\frac{4(Z_{T2})^2}{5Z_{T2}}=300$$

$$Z_{T2}=375\text{ ohms}$$

$$Z_{T1}=4Z_{T2}=1500\text{ ohms}$$

Finally, $$Z_1=\sqrt{(Z_{T1})(Z_{A1})}=\sqrt{1500\times300}=670\text{ ohms}$$

$$Z_2=\frac{Z_1}{2}=335\text{ ohms}$$

From the foregoing, it may be seen that, with the antenna arrangement of Fig. 4, the desired current ratio is obtained at the high resonant frequency of the dipole 42 when the characteristic impedance of the impedance transformer 48*a*, 48*b* is about 670 ohms and that of the impedance transformer 49*a*, 49*b* is about 335 ohms. At the same time, a substantially perfect match of the antenna as a whole to a 300 ohm transmission line at the high resonant frequency of the short dipole 42 is obtained.

When the antenna of Fig. 4, designed in accordance with the above calculations, is operating at the low, half-wave resonant frequency of the long dipole 41, this dipole again has an impedance of approximately 300 ohms, while the short dipole 42 is operating so far below its half-wave resonant frequency that it has a very high reactive impedance. Since the impedance transformers are only 1/12 wave length long at this frequency, they cause little impedance transformation. As a result, the impedance of the long dipole 41 and its impedance transformer, at the terminals *a, b,* is still close to 300 ohms, and the parallel impedance of the short dipole 42 and its impedance transformer, at the terminals *a, b,* is so high that the impedance of the antenna as a whole is still close to 300 ohms. Thus, at the low half-wave resonant frequency of the long dipole 41, practically all of the transmission line current is fed to the long dipole 41, which acts substantially the same as a conventional, low band, folded dipole, with little effect from the other elements of the antenna system.

Because the large wire spacing and small wire diameters required to produce a 670 ohm impedance transformer are difficult to use in practice, some reduction of this impedance is desirable. A first compromise in this direction may be to reduce the impedance of the transformer feeding the short dipole 42 to 300 ohms, thus permitting reduction of the 670 ohm impedance of the other transformer to 600 ohms, while still maintaining the same 2:1 ratio of the currents in the short and long dipoles. When this is done, the impedance of the antenna as a whole will drop to about 240 ohms, which still provides a very good match with the 300 ohm impedance of the transmission line at the high frequency of operation and has a negligible effect on the impedance of the antenna at the low frequency of operation.

A second compromise in this direction is to further reduce the impedance of the transformer feeding the long dipole 41 to, say, 500 ohms or even 450 ohms, while leaving the impedance of the other transformer unchanged. This produces a departure from the ideal 2:1 ratio of currents desired in the two dipoles in the interest of a more practical physical structure. When this is done, use of formulae employed above will demonstrate that the impedance of the antenna as a whole remains high enough so that it still has a good match with the impedance of the transmission line. The impedance of the transformer feeding the long dipole 41 will still be at least twice the impedance of the antenna as a whole, and the impedance of the transformer feeding the long dipole 41 will still be at least 50% greater than the impedance of the other transformer feeding the short dipole 42.

Still another compromise of the ideal relationships which may be employed is to arbitrarily reduce the impedance of both transformers to, say, 500 ohms and 250 ohms respectively. This maintains the ideal ratio of currents in the two dipoles by keeping the impedance ratios of the two transformers the same, though it involves a somewhat further departure from the desired match of the impedance of the antenna as a whole to the impedance of the transmission line.

As will be understood by those skilled in the art, the foregoing discussion has been based on theoretical analysis of the electrical circuits shown and described, without reference to the effects of mutual coupling between the dipoles, the effects of directors, reflectors, etc. which may be added to any antenna array, and other factors which affect the measured impedances of antennas and of their component parts in practice. Thus, it will be appreciated that various dimensions, both physical and electrical, may be adjusted in the dipoles themselves and in the harness connecting them to accommodate such factors; and that the values specified herein and in the appended claims should be taken as approximations of the values that may be measured in practice. It will also be appreciated that all of the arrays described above and shown in Figs. 1 to 4 inclusive would normally be employed with some kind of reflector and/or director system for enhancing the gain of the antenna in one direction and reducing the gain from the opposite direction. For example, a conventional screen reflector (not shown) might be disposed behind both dipoles in any of Figs. 1 to 4 whereby they would operate as described only in a forward direction broadside to the dipoles, i.e., normal to the vertical plane in which the dipoles are disposed in these embodiments of the invention. Thus, the antenna in each case would have a single direction of maximum gain and would preferably be oriented in use so that the antenna will be effective in the desired direction for optimum energy radiation or reception.

Figures 5, 6:
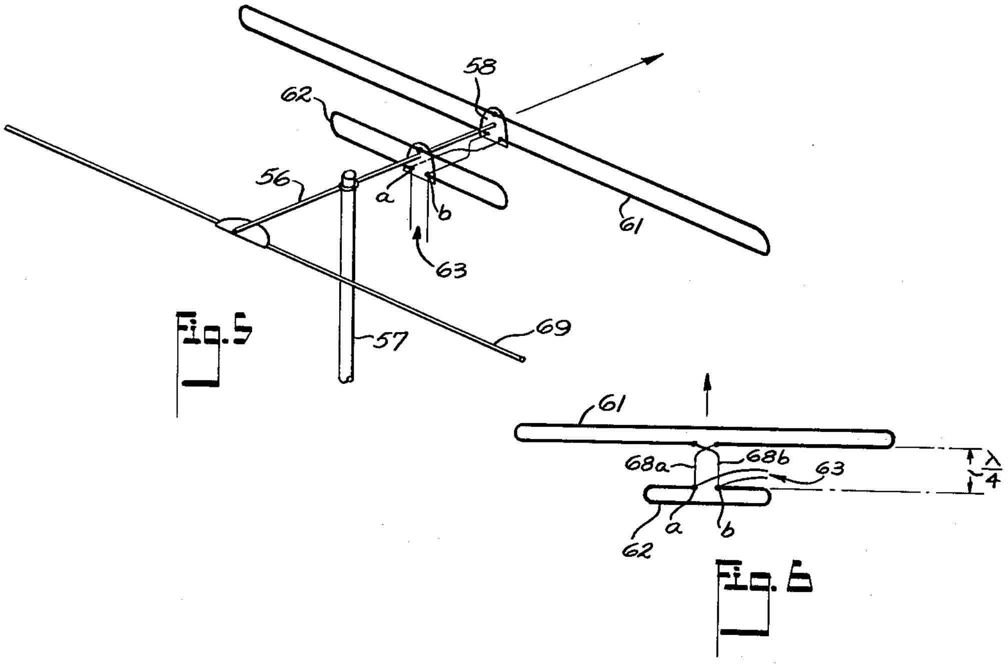
Fig. 5 is a diagrammatic perspective view of the modification of the invention in which the low band dipole is disposed in front of the high band dipole with respect to the direction of transmission of a signal, and the dipoles are shown mounted, together with a low band reflector, on a single cross-arm supported by a mast.
Fig. 6 is a diagrammatic plan view of the dipoles of Fig. 5, showing more clearly the manner in which they are connected for operation 180° out of phase.

Turning now to Figs. 5 and 6, the invention is shown in a form utilizing the spacial relationship of the dipoles to position them 90° out of phase in space and thereby simplify the connecting harness and the mounting structure. As shown, the antenna may be constructed on a horizontal cross-arm 56 suitably secured to a vertical mast 57. A long folded dipole 61 may be mounted in any desired manner on one end of the cross-arm 56, as by means of an insulator 58, and a short folded dipole 62 may be similarly mounted behind the long dipole 61 with respect to the direction of transmission (indicated by the arrow). As in the other forms of the invention previously described, the short dipole 62 is tuned to operate as a half-wave radiating element at about 3 times the half-wave resonant frequency of the long dipole 61. The spacing of the two dipoles is substantially 1/4 wave length at the half-wave resonant frequency of the short dipole 62 so that it is physically disposed 90° out of phase with the long dipole 61.

Referring for the moment back to the antenna of Fig. 4 let it be assumed that $Z_1$ and $Z_2$ are 600 ohms and 300 ohms, respectively, in the formulae employed above. Since $Z_{A2}$ at the high resonant frequency of the short dipole 42 is also about 300 ohms, the impedance anywhere along the length of the impedance transformer 49*a*, 49*b* will be 300 ohms. Therefore, from consideration of impedance and current amplitudes only, the length of this impedance transformer is of no significance. To keep the current in the short dipole 42 out of phase with the center current loop in the long dipole 41, however, and for this reason only, the impedance transformers 48*a*, 48*b* and 49*a*, 49*b* should both be 1/4 wave length long at the high resonant frequency of the short dipole 42. Thus, in the antenna of Figs. 5 and 6, the impedance transformer connecting the short dipole 42 of Fig. 4 has been reduced to zero length (eliminated) without changing the impedance and current valves, and the 90° phase shift produced by the impedance transformer 49*a*, 49*b* in the antenna of Fig. 4 has been achieved in the antenna of Figs. 5 and 6 by disposing the short dipole 62, 90° in space behind the long dipole 61.

In this case, the terminals *a, b* for a transmission line 63 may be the feed points for the short dipole 62 so that the connection of this dipole to the transmission line terminals *a, b* is of substantially zero electrical length. A harness for connecting the two dipoles in parallel in this case may simply be a pair of conductors 68*a*, 68*b* which are substantially 1/4 wave length long at the high resonant frequency of the short dipole 62. These conductors are disposed in parallel, spaced relationship over substantially the 1/4 wave length spacing of the two dipoles (Fig. 6) to provide a quarter wave impedance transformer, and are crossed at either end or at some point along their length for reversing the connection of the long dipole 61 to the transmission line terminals relative to the connection of the short dipole 62 thereto. Thus, in effect, the quarter wave impedance transformer 68*a*, 68*b* provides a 90° phase difference between the two dipoles which adds to the 90° difference resulting from their spacing along the direction of signal transmission.

Utilizing the above formulae and noting that $Z_2$ (impedance of the transformer feeding the short dipole 62) is, in effect, the 300 ohm impedance of the short dipole itself, and that $Z_{T2}$ (impedance of the short dipole 62 measured at terminals *a, b*) is also 300 ohms, it will be found that $Z_1$ (impedance of the transformer 68*a*, 68*b* feeding the long dipole 61) should ideally be 600 ohms, giving an antenna impedance $Z_T$ of 240 ohms. As before, and for the same reasons, it may be desirable in practice to reduce the impedance $Z_1$ to 500 ohms or even 450 ohms.

The performance of the driven elements of the antenna of Figs. 5 and 6 is essentially the same as that of the antenna of Fig. 4 when the characteristic impedance of the transformer 49*a*, 49*b* feeding the short dipole 42 is fixed at 300 ohms. It differs, however, in that the described mode of operation at the half-wave resonant frequency of the short dipole 62 holds true only for the one direction of transmission indicated by the arrow in the drawing, the antenna of Figs. 5 and 6 having a substantial front-to-back ratio at that frequency.

The advantages of the antenna of Figs. 5 and 6, in addition to its front-to-back ratio, are that the feeding harness has been further simplified, the mounting of the driven elements directly on the same horizontal cross-arm is possible by reason of their horizontal alignment, and one or more reflectors, such as the reflector 69, may be similarly mounted on the same cross-arm, along with directors as well, if desired. These advantages all contribute to the reduced cost, complexity, weight, etc. of the antennas of this invention referred to above in reciting the objects of the invention.

Referring finally to Figs. 7 and 8, the invention is shown in a form which again utilizes the spacial relationship of the dipoles to position them 90° out of phase in space and thereby simplify the connecting harness and the mounting structure. Again, the antenna may be constructed on a horizontal cross-arm 76 suitably secured to a vertical mast 77. A long folded dipole 81 may be mounted in any desired manner between the mast 77 and one end of the cross-arm 76, as by means of an insulator 78; and a short folded dipole 82 may be similarly mounted outwardly beyond the long dipole 81 in the direction of transmission (indicated by the arrow). As in the other forms of the invention previously described, the short dipole 82 is tuned to operate as a half-wave radiating element at about 3 times the half-wave resonant frequency of the long dipole 81. The spacing of the two dipoles, as in the antenna of Figs. 5 and 6, is substantially ¼ wave length at the half-wave resonant frequency of the short dipole 82, so that it is physically disposed 90° out of phase with the long dipole 81.

Again, the terminals *a, b* for the transmission line 83 may be the feed points for the short dipole 82, so that the connection of this dipole to the transmission line terminals *a, b* is of substantially zero electrical length. A harness for connecting the two dipoles in parallel may be a pair of conductors 88*a* and 88*b* which are substantially ¼ wave length long at the high resonant frequency of the short dipole 82. These conductors are disposed in spaced parallel relationship to provide a quarter-wave impedance transformer. In this instance, however, these conductors are respectively connected to corresponding feed points on the two dipoles and are not crossed as in the other embodiments of the invention shown and described herein. Since the long dipole 81 is physically disposed 90° behind the short dipole 82 with respect to their direction of transmission and is connected to the transmission line terminals *a, b* by a quarter-wave line section, which causes a further 90° phase delay, the resultant effect is a 180° phase difference between the two dipoles.

The impedance relationships involved in the design of the two dipoles and connecting harness in the antenna of Figs. 7 and 8 are the same as in the antenna of Figs. 5 and 6, and the mode of operation is essentially the same, except that the direction of transmission is reversed with respect to the relative positions of the two dipoles.

The advantage of the antenna of Figs. 7 and 8 are also essentially the same as those of the antenna of Figs. 5 and 6 except that a somewhat longer cross-arm 76 is required to position a low band reflector a specified distance behind the low band dipole 81.

As will be apparent to those skilled in the art, the same considerations involved in arriving at the designs of the two antennas shown in Figs. 5 and 6 and Figs. 7 and 8 make possible other similar departures from the antenna of Fig. 4 while still utilizing the principles of the invention. Thus, for example, the transmission line 63 in Figs. 5 and 6 could be connected directly to the terminals of the long dipole 61, and the crossing of the impedance transformer wires 68*a* and 68*b* could be eliminated. Similarly, the transmission line 83 in Figs. 7 and 8 could be connected directly to the terminals of the long dipole 81 and the impedance transformer wires 88*a* and 88*b* could be crossed. Such modifications would, of course, require changing the characteristic impedance of the single impedance transformer in each case, in accordance with the formulae given above, to maintain at least an approximation of the desired 2:1 ratio of currents in the short and long dipoles. Ideally, this would involve the use of a single impedance transformer having a characteristic impedance of about 150 ohms connecting the short dipole to the transmission line where both dipoles are folded dipoles. Such modifications also change the standing wave ratio of the antenna as a whole at the high and low frequencies, and may or may not be desirable for television receiving antennas depending upon the reception problems to be encountered in a given location.

The modifications that may be made in the antennas of Figs. 5 and 6 and Figs. 7 and 8 by simple revision of the single impedance transformer and shifting the points of connection of the transmission line from one dipole to the other, as explained above, make it a simple matter in practice to modify either type of production antenna to best suit the needs at different installation locations.

From the foregoing description of a number of different embodiments of the present invention, it will be appreciated that it may be employed in a variety of forms. It will also be appreciated that the various objectives and advantages of the invention have been achieved in a simple manner which may be readily utilized to advantage in the commercial production of antennas, particularly for television reception.

While the forms of the invention described with reference to Figs. 1, 2, and 3 will normally be less suitable in meeting the problems of television reception, they are readily adaptable for meeting specialized problems in various other fields of radio frequency transmission and reception. Utilizing the same general formulae and taking into account the various other factors entering into practical antenna design, suitable impedance values and other dimensions may also be readily determined to adapt the forms of the invention illustrated in Figs. 1, 2, and 3, to the needs of any particular, special, reception or transmission problems.

Having described my invention, I claim:

1. A radio frequency antenna comprising first and second dipoles, means mounting said dipoles in spaced parallel relationship for maximum gain in a direction normal to said dipoles, the half-wave resonant frequency of said first dipole being substantially one-third the half-wave resonant frequency of said second dipole, a pair of transmission line terminals, first means connecting said first dipole to said terminals and second means connecting said second dipole to said terminals for operation 180° out of phase with said first dipole in said direction of maximum gain at the higher of said frequencies, the impedance of said first dipole and said first means being at least substantially 2¼ times that of said second dipole and said second means when measured at said terminals at said higher frequency.

2. A radio frequency antenna comprising first and second dipoles, means mounting said dipoles in spaced parallel relationship for maximum gain in a direction normal to said dipoles, the half-wave resonant frequency of said first dipole being substantially one-third the half-wave resonant frequency of said second dipole, a pair of transmission line terminals, first means connecting said first dipole to said terminals and second means connecting said second dipole to said terminals for operation 180° out of phase with said first dipole in said direction of maximum gain at the higher of said frequencies, the impedance of said first dipole and said first means being substantially 4 times that of said second dipole and said second means when measured at said terminals at said higher frequency.

3. A radio frequency antenna suitable for transmission and reception at two different frequencies where the higher frequency is substantially three times the lower frequency, comprising a first dipole tuned to operate as a half-wave radiating element at the lower frequency, a second dipole tuned to operate as a half-wave radiating element at the higher frequency, said dipoles being disposed in spaced parallel relationship, a pair of terminals for a two-conductor transmission line, separate impedance transformers respectively connecting said dipoles in parallel to said terminals for operation 180° out of phase with each other at said higher frequency in a single direction of maximum gain, the impedance of said first dipole and its impedance transformer being at least substantially 2¼ times that of said second dipole and its impedance transformer when measured at said terminals at said higher frequency.

4. A radio frequency antenna according to claim 3 in which the electrical length of each of said impedance transformers is substantially ¼ wave length at said higher frequency.

5. A radio frequency antenna suitable for transmission and reception at two different frequencies where the higher frequency is substantially three times the lower frequency, comprising a first dipole tuned to operate as a half-wave radiating element at the lower frequency, a second dipole tuned to operate as a half-wave radiating element at the higher frequency, said dipoles being disposed one in front of the other with respect to a common direction of maximum gain of said dipoles and being spaced in said direction substantially ¼ wave length at said higher frequency, a pair of terminals for a two-conductor transmission line, and means connecting said dipoles in parallel to said terminals for operation 180° out of phase with each other in said direction at said higher frequency, the connections between said terminals and one of said dipoles having substantially zero electrical length, and the connections between said terminals and the other of said dipoles having an electrical length of substantially ¼ wave at said higher frequency and being an impedance transformer, the characteristic impedance of said impedance transformer being selected to render the impedance of said first dipole at least substantially 2¼ times the impedance of said second dipole when measured at said terminals at said higher frequency.

6. A radio frequency antenna suitable for transmission and reception at two different frequencies where the higher frequency is substantially three times the lower frequency, comprising a first dipole tuned to operate as a half-wave radiating element at the lower frequency, a second dipole tuned to operate as a half-wave radiating element at the higher frequency, said dipoles being disposed one in front of the other with respect to a common direction of maximum gain of said dipoles and being spaced in said direction substantially ¼ wave length at said higher frequency, a pair of terminals for a two-conductor transmission line, and means connecting said dipoles in parallel to said terminals for operation 180° out of phase with each other in said direction at said higher frequency, the connections between said terminals and one of said dipoles having substantially zero electrical length, and the connections between said terminals and the other of said dipoles having an electrical length of substantially ¼ wave at said higher frequency and being an impedance transformer, the characteristic impedance of said impedance transformer being selected to render the impedance of said first dipole approximately 4 times the impedance of said second dipole when measured at said terminals at said higher frequency.

7. A radio frequency antenna suitable for transmission and reception at two different frequencies where the higher frequency is substantially three times the lower frequency, comprising a first dipole tuned to operate as a half-wave radiating element at the lower frequency, a second dipole tuned to operate as a half-wave radiating element at the higher frequency, said first dipole being disposed in front of said second dipole with respect to a common direction of maximum gain of the antenna and being spaced in said direction substantially ¼ wave length at said higher frequency, a pair of transmission line terminals, and means connecting said dipoles in parallel to said terminals, the connections between said terminals and said second dipole having substantially zero electrical length, the connections between said terminals and said first dipole having an electrical length of substantially ¼ wave at said higher frequency and being an impedance transformer, the impedance of said impedance transformer and said first dipole being at least substantially 2¼ times the impedance of said second dipole when measured at said terminals at said higher frequency, and the connections of said first dipole to said terminals being reversed relative to the connections of said terminals to said second dipole whereby said dipoles are connected for operation 180° out of phase with each other in said direction at said higher frequency.

8. A radio frequency antenna suitable for transmission and reception at two different frequencies where the higher frequency is substantially three times the lower frequency, comprising a first dipole tuned to operate as half-wave radiating element at the lower frequency, a second dipole tuned to operate as a half-wave radiating element at the higher frequency, said second dipole being disposed in front of said first dipole with respect to a common direction of maximum gain of the antenna and being spaced in said direction substantially ¼ wave length at said higher frequency, a pair of transmission line terminals, and means connecting said dipoles in parallel to said terminals, the connections between said terminals and said second dipole having substantially zero electrical length, the connections between said terminals and said first dipole having an electrical length of substantially ¼ wave at said higher frequency and being an impedance transformer, the impedance of said impedance transformer and said first dipole being at least substantially 2¼ times the impedance of said second dipole when measured at said terminals at said higher frequency, and said terminals being connected to corresponding sides of the two dipoles, whereby said dipoles are connected for operation 180° out of phase with each other at said higher frequency.

9. A radio frequency antenna comprising first and second folded dipoles, means mounting said dipoles in spaced parallel relationship for maximum gain in a direction normal to said dipoles, the half-wave resonant frequency of said first dipole being substantially one-third the half-wave resonant frequency of said second dipole, a pair of transmission line terminals, first means connecting said first dipole to said terminals and second means connecting said second dipole to said terminals for operation 180° out of phase with said first dipole in said direction of maximum gain at the higher of said frequencies, the impedance of said first dipole and said first means being at least substantially 2¼ times that of said second dipole and said second means when measured at said terminals at said higher frequency.

10. An antenna according to claim 9 in which the connections of said terminals to one of said dipoles has an electrical length shorter than the connections of said terminals to the other of said dipoles by substantially ¼ wave length at said higher frequency, and said dipoles are spaced one in front of the other in said direction of maximum gain by substantially ¼ wave length at said higher frequency.

11. An antenna according to claim 9 in which the connections of said terminals to one of said dipoles are of substantially zero electrical length, the connections of said terminals to the other of said dipoles have electrical lengths of substantially ¼ wave at said higher frequency, and said dipoles are spaced one in front of the other in said direction of maximum gain by substantially ¼ wave length at said higher frequency.

12. A radio frequency antenna comprising first and second folded dipoles, means mounting said dipoles in spaced parallel relationship for maximum gain in a direction normal to said dipoles, the half-wave resonant frequency of said first dipole being substantially one-third the half-wave resonant frequency of said second dipole, a pair of transmission line terminals, first means connecting said first dipole to said terminals and second means connecting said second dipole to said terminals for operation 180° out of phase with said first dipole in said direction of maximum gain at the higher of said frequencies, the impedance of said first dipole and said first means being substantially 4 times that of said second dipole and said second means when measured at said terminals at said higher frequency.

13. A radio frequency antenna suitable for transmission and reception at two different frequencies where the higher frequency is substantially three times the lower frequency and having a forward direction of maximum gain, comprising a first folded dipole tuned to operate as a half-wave radiating element at the lower frequency, a second folded dipole tuned to operate as a half-wave radiating element at the higher frequency, a pair of terminals for a two-conductor transmission line, said dipoles being disposed in spaced parallel relationship and connected in parallel to said terminals for operation 180° out of phase with each other in said direction at said higher frequency, and impedance transformer means interposed in series between said terminals and both of said dipoles, the characteristic impedance of the impedance transformer means in series with said first dipole being substantially twice the characteristic impedance of the impedance transformer means in series with said second dipole.

14. A radio frequency antenna suitable for transmission and reception at two different frequencies where the higher frequency is substantially three times the lower frequency and having a forward direction of maximum gain, comprising a first folded dipole tuned to operate as a half-wave radiating element at the lower frequency, a second folded dipole tuned to operate as a half-wave radiating element at the higher frequency, said dipoles being disposed one in front of the other with respect to said direction of maximum gain and being spaced in said direction substantially ¼ wave length at said higher frequency, a pair of terminals for a two-conductor transmission line, and means connecting said dipoles in parallel to said terminals for operation 180° out of phase with each other in said direction at said higher frequency, the connections between said terminals and said second dipole having substantially zero electrical length, and the connections between said terminals and said first dipole having an electrical length of substantially ¼ wave at said higher frequency and being an impedance transformer having a characteristic impedance between substantially 450 and substantially 600 ohms.

15. A radio frequency antenna suitable for transmission and reception at two different frequencies where the higher frequency is substantially three times the lower frequency and having a forward direction of maximum gain, comprising a first folded dipole tuned to operate as a half-wave radiating element at the lower frequency, a second folded dipole tuned to operate as a half-wave radiating element at the higher frequency, said dipoles being disposed one in front of the other with respect to said direction of maximum gain and being spaced in said direction substantially ¼ wave length at said higher frequency, a pair of terminals for a two-conductor transmission line, and means connecting said dipoles in parallel to said terminals for operation 180° out of phase with each other in said direction at said higher frequency, the connections between said terminals and said first dipole having substantially zero electrical length, and the connections between said terminals and said second dipole having an electrical length of substantially ¼ wave at said higher frequency and being an impedance transformer having a characteristic impedance that is substantially half the impedance of said first dipole.

16. An antenna according to claim 15 in which the impedance of said first dipole is substantially 300 ohms at said higher frequency and the characteristic impedance of said impedance transformer is substantially 150 ohms.

References Cited in the file of this patent

UNITED STATES PATENTS

| | | |
|---|---|---|
| 2,474,480 | Kearse | June 28, 1949 |
| 2,510,010 | Callaghan | May 30, 1950 |
| 2,632,108 | Woodward | Mar. 17, 1953 |
| 2,691,730 | Lo | Oct. 12, 1954 |